United States Patent

Ikehara

Patent Number: 5,584,169
Date of Patent: Dec. 17, 1996

[54] STEEL CORD

[75] Inventor: Kiyoshi Ikehara, Tokyo, Japan

[73] Assignee: Bridgestone Corporation, Tokyo, Japan

[21] Appl. No.: 348,200

[22] Filed: Nov. 28, 1994

Related U.S. Application Data

[63] Continuation of Ser. No. 2,035, Jan. 8, 1993, abandoned.

[30] Foreign Application Priority Data

| Jan. 9, 1992 | [JP] | Japan | 4-019374 |
| Jan. 9, 1992 | [JP] | Japan | 4-019375 |
| Jan. 9, 1992 | [JP] | Japan | 4-019376 |
| Dec. 25, 1992 | [JP] | Japan | 4-347279 |
| Dec. 25, 1992 | [JP] | Japan | 4-347280 |
| Dec. 25, 1992 | [JP] | Japan | 4-347281 |

[51] Int. Cl.$^6$ .................................................. D02G 3/36
[52] U.S. Cl. ........................ 57/212; 57/311; 57/902
[58] Field of Search .................. 57/210, 212, 213, 57/217, 223, 311, 902

[56] References Cited

U.S. PATENT DOCUMENTS

| 4,509,318 | 4/1985 | Yoneda | 57/212 |
| 4,566,261 | 1/1986 | Brandyberry et al. | 57/212 |
| 4,690,191 | 9/1987 | Kawasaki | 57/902 X |
| 4,887,421 | 12/1989 | Haislet | 57/58.54 |
| 4,938,015 | 7/1990 | Kinoshita | 57/902 X |
| 5,024,261 | 6/1991 | Igarashi et al. | 57/902 X |

FOREIGN PATENT DOCUMENTS

| 462716 | 12/1991 | European Pat. Off. | 57/902 |
| 2476548 | 8/1981 | France . | |
| 2676466 | 11/1992 | France | 57/902 |
| 56-14396 | 4/1981 | Japan . | |
| 56-131404 | 10/1981 | Japan . | |
| 59-1790 | 1/1984 | Japan . | |
| 60-38208 | 2/1985 | Japan . | |
| 60-49421 | 11/1985 | Japan . | |
| 60-178204 | 11/1985 | Japan . | |
| 62-21641 | 5/1987 | Japan . | |
| 1175503 | 7/1989 | Japan . | |
| 2154086 | 6/1990 | Japan . | |

OTHER PUBLICATIONS

Research Disclosure, No. 175, Nov. 1978, Emsworth GB, pp. 26–28.
Research Disclosure, No. 327, Jul. 1991, Emsworth GB, pp. 552–558.

Primary Examiner—Michael R. Mansen
Attorney, Agent, or Firm—Sughrue, Mion, Zinn, Macpeak & Seas

[57] ABSTRACT

A steel cord for reinforcing rubber articles comprises one wave-form or helical core steel filament and a plurality of sheath steel filaments disposed around the core steel filament, the pitch Pc of the core steel filament is $3.0 \ dc/0.34 \leq Pc \leq 10.0 \ dc/0.34$ (dc=diameter of steel core filament) and the core forming ratio $Rc=Lc/dc$ (Lc is an amplitude of the wave or helix of the core steel filament) is within a particular range varying depending on the number of sheath steel filaments. The rubber articles containing the steel cord have an improved resistance to corrosion propagation and a high strength. A pneumatic tire is reinforced with the above-mentioned steel cord and contains a cross belt layer where (i) an angle θ formed by a reinforcing steel cord and the equatorial plane of the tire is:

$12° \leq θ \leq 30°$ (ii) a gap between adjacent two steel cords in the same layer, I, is:

$0.5 \ mm \leq I \leq 2.0 \ mm$ (iii) a gauge of the gum between two facing cords, G, is:

$0.35 \ mm \leq G \leq 2.0 \ mm$

The pneumatic tire exhibits suppression of development of crack at the belt end in addition to the advantages as above.

3 Claims, 5 Drawing Sheets

STEEL CORD

This is a continuation of application No. 08/002,035 filed Jan. 8, 1993, now abandoned.

BACKGROUND OF THE INVENTION

1. Field of the Invention

The present invention relates to a steel cord for reinforcing rubber articles, and more particularly, to a steel cord-for reinforcing rubber articles capable of improving the resistance to corrosion propagation.

2. Description of the Related Art

Products reinforced with steel cords are liable to suffer from corrosion of steel filaments caused by water entering the products and thereby the durability and life of the products are lowered.

For example, when steel cords used in a belt of a tire with a void and the tire tread is subjected to damage reaching the belt, water entering the belt spreads along the longitudinal direction of the cord through the voids in the steel cords. As a result, rust formed due to water also diffuses and the adhesion between rubber and steel cord is lowered at that portion. Finally, separation phenomena occur.

In order to prevent such corrosion propagation, there is proposed a cord structure in which rubber can sufficiently penetrate into the inside of the cord through gaps between adjacent metal filaments by curing process.

Japanese Patent Publication Nos. 21641/1987 and 49421/1985 disclose that gaps between filaments of a cord can be formed by excess shaping. However, retaining such gaps is difficult and moreover the advantageous effect varies undesirably depending on the manner of handling in the step of manufacturing tires.

On the contrary, there are proposed techniques for assuring gaps between filaments by improving the cord structure without shaping filaments.

Japanese Patent Application Laid-open Nos. 38208/1985 and 1790/1984 disclose that one of the above-mentioned cord structure, so-called "(1+5) structure" cord composed of one core filament and five sheath filaments, has gaps between sheath filaments and rubber can easily penetrate the gaps, and further this cord can be produced by one-step twisting. As a result productivity is high.

Indeed the average sheath gaps are sufficient in such a cord structure, but deviation occurs in the arrangement of sheath filaments and there are formed attaching portions of the filaments resulting in forming the portions where rubber does not penetrate due to fluctuation in the manufacturing procedure.

Japanese Patent Application Laid-open No. 175503/1989 proposed a steel cord composed of one core filament and six sheath filaments, and Japanese Utility Model Application No. 178204/1985 and Japanese Patent Application Laid-open No. 154086/1990 disclose two-layer twisted steel cords composed of a core of two metal filaments and a sheath filament disposed around the core.

In particular, the (1+6) structure cord of the above-mentioned Japanese Patent Application Laid-open No. 175503/1989 can be produced by one step twisting and therefore, is advantageous from the standpoint of productivity. The disclosed (1+6) cord has a structure such that the diameter of the core filament is larger than that of the sheath filament so as to ensure a gap larger than a predetermined size between adjacent sheath filaments for enabling rubber to penetrate the inside. However, since partly a deviation occurs in the arrangement of sheath cores, rubber does penetrates at the side where sheath filaments contact each other and therefore, a sufficient resistance to corrosion propagation can not be attained in the case of tires for trucks running a severely rough road with much water. Further, the weight of cord is large and the productivity is lowered.

Japanese Patent Application Laid-open No. 131404/1981 discloses that a cord of (1+5) structure may be formed such that the core filament is lightly waved, but in this cord structure the diameter of the core filament is thinner than that of the sheath filament and therefore, the distance between sheath filaments is so narrow that rubber can not easily enter the gap, and further, since rigidity of core filament is so low that the wave shape of the core exhibits only a lowered effect. In addition, when the core shaping ratio (waving) is large, the strength is lowered.

It may be thought that a diameter of the core filament is made larger than that the sheath filament to assure a gap larger than a predetermined size between adjacent filaments for purposes of making rubber penetrate the inside. However, such method increase the total weight of the cord, the productivity is deteriorated and deviation of the arrangement of sheath filament occurs partly to cause attachment between sheath filaments each other. As a result, rubber can not penetrate the cord resulting in less resistance to corrosion propagation,

SUMMARY OF THE INVENTION

An object of the present invention is to provide a steel cord capable of improving the life of rubber articles.

Another object of the present invention is to provide a steel cord capable of improving the resistance to corrosion propagation of rubber articles.

A further object of the present invention is to provide a steel cord capable of improving a resistance to corrosion propagation of and imparting a high strength to rubber articles.

Still another object of the present invention is to provide a pneumatic tire reinforced with one of the above-mentioned steel cords.

According to one aspect of the present invention, there is provided a steel cord for reinforcing rubber articles which comprises one wave-form core steel filament, and a plurality of sheath steel filaments disposed around the wave-form core steel filament, the pitch Pc of the crimped core steel filament being in the following range, $$3.0 \, dc/0.34 \leq Pc \leq 10.0 \, dc/0.34$$

where dc is the diameter of the core steel filament, and the core forming ratio Rc (=Lc/dc) where dc is as defined above and Lc is an amplitude of the crimp of the core steel filament being selected from the group consisting of $$0.12 \leq Rc \leq 1.0$$

in the case of five sheath steel filaments, $$0.12 \leq Rc \leq 1.5$$

in the case of six sheath steel filaments, $$0.48 \leq Rc \leq 1.86$$

in the case of seven sheath steel filaments, and $$0.98 \leq Rc \leq 2.36$$

in the case of eight sheath steel filaments.

According to another aspect of the present invention, there is provided a steel cord for reinforcing rubber articles which comprises
one helical core steel filament, and a plurality of sheath steel filaments disposed around the helical core steel filament,
the pitch Pc of the helical core steel filament being in the following range, $$3.0 \, dc/0.34 \leq Pc \leq 10.0 \, dc/0.34$$

where dc is the diameter of the core steel filament, the core forming ratio $Rc(=Lc/dc)$ where dc is as defined above and Lc is an amplitude of the helix of the core steel filament
being selected from the group consisting of $$0.12 \leq Rc \leq 1.0$$

in the case of five sheath steel filaments, $$0.12 \leq Rc \leq 1.5$$

in the case of six sheath steel filaments, $$0.42 \leq Rc \leq 1.8$$

in the case of seven sheath steel filaments, and $$0.74 \leq Rc \leq 2.12$$

in the case of eight sheath steel filaments, and the helical direction being opposite to the direction of twisting the sheath steel filaments.

According to a further aspect of the present invention, there is provided a pneumatic tire reinforced with one kind of the above-mentioned steel cords which comprises a cross belt layer where (i) an angle θ formed by a reinforcing steel cord and the equatorial plane of the tire is:

$$12° \leq θ \leq 30°$$

(ii) a gap between adjacent two steel cords in the same layer, I, is:

$$0.5 \text{ mm} \leq I \leq 2.0 \text{ mm}$$

(iii) a gauge of the gum between two facing cords, G, is:

$$0.35 \text{ mm} \leq G \leq 2.0 \text{ mm}.$$

DESCRIPTION OF THE PREFERRED EMBODIMENTS

Figure 1:
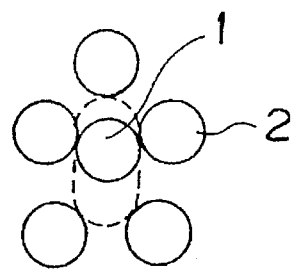
FIG. 1 is a schematical cross sectional view of a (1+5) steel cord with a wave-form core filament according to the present invention.

According to one aspect of the present invention, there is used a wavy core steel filament. The shape of wave is within a range determined by a particular range of amplitude and a particular range of pitch depending on the number of sheath steel filaments disposed around one wavy core steel filament. Thus, a gap between sheath steel filaments into which rubber penetrates can be assured. The wavy core serves to attain the following advantages.

The wavy shape can be formed in a high productivity at a low cost. Sheath filaments do not substantially contact one another. Further, the cord itself can be a flat cord since it has a flat core. Therefore, the increase in cord thickness due to forming of core can be prevented, the increase of the rubber layer gauge can be prevented. Moreover, the rubber permeability can be improved resulting in increasing the resistance to corrosion propagation.

As to the shape of wave, a wave similar to a triangle which has a sharp apex is not preferable while a wave having a mild curve such as a sine wave is preferable since concentration of a stress to the apex can be avoided. As used herein the terms "wavy" and "wave-form" are interchangeable.

The core shaping ratio Rc(=Lc/dc) of the "one wave-form core steel filament" is in the following range:

0.12≦Rc≦1.0 for (1+5) structure 0.12≦Rc≦1.5 for (1+6) structure 0.48≦Rc≦1.86 for (1+7) structure 0.98≦Rc≦2.36 for (1+8) structure.

In the partentheses above, 1 stands for "one wave-form core steel filament" and 5, 6, 7 and 8 stand for the numbers of sheath steel filaments.

When the Rc is lower than the above-mentioned range, a sufficient effect of dispersing the arrangement of sheath steel filaments, assuring properly the sheath gap and making rubber penetrate into the inside of cord is not obtained. On the contrary, Rc is higher than the above-mentioned range, the configuration of the filaments becomes uneven, and in the case where a tensile load is put on the cord, the stress is not uniformly applied and thereby, the strength of cord is lowered.

The pitch Pc of the wavy core steel filament is in the following range:

3.0 dc/0.34≦Pc≦10.0 dc/0.34

When Pc is larger than this range, a sufficient effect of dispersing the arrangement of sheath steel filaments, assuring properly the sheath gap and making rubber into the inside of cord is not obtained. On the contrary, when Pc is smaller than this range, the strength of core steel filament is lowered due to the load put on the core steel filament upon forming, and a load is not uniformly applied to core steel filaments and sheath steel filaments and the cord strength becomes insufficient in the case where a tensile load is applied to the cord.

When the steel cord is used as a reinforcing material so as to assure the strength of the rubber composite and make the rubber composite lighter, it is preferable to use a steel cord composed of a high tensile strength steel containing 0.80–0.85% by weight of carbon.

As mentioned in Description of the Related Art above, when the diameter of the core filament is much thinner or thicker than that of the sheath filament, there are various disadvantages.

Therefore, for purposes of eliminating such disadvantages and further enhancing the productivity of the manufacturing step, it is preferable that the diameter of the core steel filament dc is substantially the same as the diameter of the sheath steel filament ds.

That is, when dc is much smaller than ds, the distance between sheath steel filaments becomes so narrow that the penetration of rubber is adversely affected and the rigidity of the core steel filament is so low that the advantages due to the wave-form are lowered.

On the contrary, when dc is much larger than ds, the weight of the cord increases and productivity becomes low.

Further, deviation of the arrangement of sheath filaments occurs partly to cause attachment between sheath filaments, resulting in less penetration of rubber and insufficient resistance to corrosion proparation.

According to another aspect of the present invention, there is used one helical core steel filament. When a plurality of core filaments are used, voids are formed in the core portion and rubber can not penetrate thereinto. On the contrary, when one helical core steel filament is used, the disadvantage of a plurality of core filaments can be eliminated and further, concentration of a stress can be avoided due to the helical shape resulting in good fatigue resistance and excellent strength.

The core shaping ratio Rc(=Lc/dc)of the "one helical core steel filament" is in the following range:

0.12≦Rc≦1.0 for (1+5) structure 0.12≦Rc≦1.5 for (1+6) structure 0.42≦Rc≦1.8 for (1+7) structure 0.74≦Rc≦2.12 for (1+8) structure

In the parentheses above, 1 stands for "one helical core steel filament" and 5, 6, 7 and 8 stand for the numbers sheath steel filaments.

When the Rc is lower than the above-mentioned range, a sufficient effect of dispersing the arrangement of sheath steel filaments, assuring properly the sheath gap and making rubber penetrate into the inside of cord is not obtained. On the contrary, Rc is higher than the above-mentioned range, the configuration of the filaments becomes uneven, and in the case where a tensile load is put on the cord, the stress is not uniformly applied and thereby, the strength of cord is lowered.

The pitch Pc of the helical core steel filament is in the following range:

3.0 dc/0.34≦Pc≦10.0 dc/0.34

When Pc is larger than this range, a sufficient effect of dispersing the arrangement of sheath steel filaments, assuring properly the sheath gap and making rubber into the inside of cord is not obtained. On the contrary, when Pc is smaller than this range, the strength of core steel filament is lowered due to the load put on the core steel filament upon shaping, and a load is not uniformly applied to core steel filaments and sheath steel filaments and the cord strength becomes insufficient in the case where a tensile load is applied to the cord.

The core forming ratio Rc and the pitch of helical core steel filament Pc are determined by measuring a steel core taken out from a rubber article without causing plastic deformation.

The helical direction of the core steel filament is opposite to the direction of twisting the sheath steel filaments according to the present invention. When both directions are the same, the length of the helical core steel filament contacting the same sheath filament becomes long and therefore, the helical core steel filament contacts two sheath filaments and portions into which rubber can not penetrate (cf. FIG. 10, the right upper part where a helical core steel filament 5 contacts two sheath steel filaments) are connected in the longitudinal direction resulting in a low resistance to corrosion propagation.

When the steel cord is used as a reinforcing material to assure the strength of the rubber composite and make the rubber composite lighter, it is preferable to use a steel cord composed of a high tensile strength steel containing 0.80–0.85% by weight of carbon.

In this aspect of the present invention, it is also preferable that the diameter of the helical core steel filament dc is substantially the same as the diameter of the sheath steel filament ds. The reason is the same as that in the previous aspect of the present invention relating to the wavy core steel filament and sheath steel filaments.

The steel cord for reinforcing rubber articles of the present invention is useful as a reinforcing material for various rubber articles, for example, rubber composites such as pneumatic tires, belts for industry and the like.

The steel cord according to the present invention can suppress the propagation of corrosion due to water and the like, that is, the resistance to corrosion propagation is improved, and therefore, the separation phenomenon can be prevented while the strength of cord can be retained.

Rubber can sufficiently penetrate into the steel cord of the present invention, that is, a sufficient amount of rubber after curing can stably penetrate into the steel cord having the particular structure according to the present invention.

According to the present invention, using a helical core steel filament, sheath filaments can be brought into a state that they do not substantially contact one another, by making the helical direction of the helical core steel filament opposite to the direction of twisting the sheath steel filaments.

The steel cord of the present invention can be manufactured having a good productivity and is not adversely affected by the fluctuation in the manufacturing step.

According to the present invention, durability of rubber articles, for example, rubber composites, can be improved and the life can be extended while the mechanical strength of the rubber articles is retained.

FIG. 1 shows schematically a cross sectional view of a (1+5) steel cord composed of one wavy core filament 1 and five sheath filaments 2 twisted around the wave-form core filament 1 according to the present invention.

The wavy core filament 1 extends in the space shown by the closed dotted line.

Figure 2:
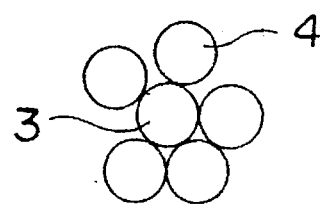
FIG. 2 is a schematical cross sectional view of a conventional (1+5) steel cord with a core filament not formed.

FIG. 2 shows schematically cross sectional view of a conventional (1+5) steel cord. Around a core filament (not formed) 3 are twisted five sheath filaments 4, and three of the sheath filaments are contacted with each other.

Figure 3:
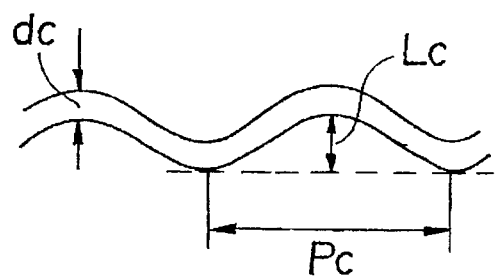
FIG. 3 is a schematical cross sectional view of a wave-form core filament cut along the wave plane according to the present invention.

FIG. 3 schematically shows a cross sectional view of a core filament 1 cut parallel to the wave plane of the present invention, dc stands for the diameter of core filament 1, Lc the amplitude of the wavy core filament and Pc the pitch of the wavy core filament.

Core forming ratio Rc is defined as follows:

$$Rc = Lc/dc$$

Figure 4:
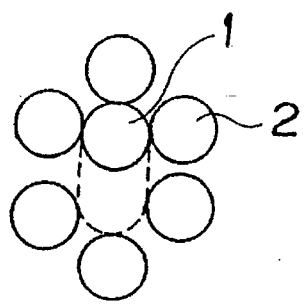
FIG. 4 is a schematical cross sectional view of a (1+6) steel cord with a wave-form core filament according to the present invention.

FIG. 4 shows schematically a cross sectional view of a (1+6) steel cord composed of one wavy core filament 1 and six sheath filaments 2 twisted around the wave-form core filament 1 according to the present invention.

The wavy core filament 1 extends in the space shown by the closed dotted line.

Figure 5:
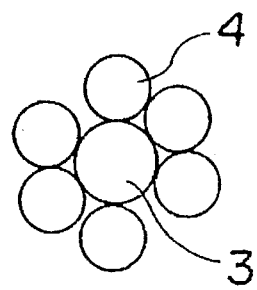
FIG. 5 is a schematical cross sectional view of a formed and the diameter of the core filament being larger than that of the sheath filament.

FIG. 5 shows schematically a cross sectional view of a conventional (1+6) steel cord composed of one core filament 3 not formed and six sheath filaments 4 twisted around the core filament 3. The diameter of core filament 3 is larger than that of sheath filament 4. Two sheath filaments and three sheath filaments are contacted one another.

Figure 6:
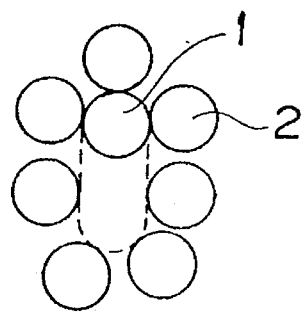
FIG. 6 is a schematical cross sectional view of a (1+7) steel cord with a wave-form core filament according to the present invention.

FIG. 6 shows schematically a cross sectional view of a (1+7) steel cord composed of one wavy core filament 1 and seven sheath filaments 2 twisted around the wave-form core filament 1 according to the present invention.

The wavy core filament 1 extends in the space shown by the closed dotted line.

Figure 7:
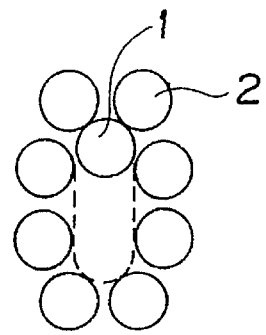
FIG. 7 is a schematical cross sectional view of a (1+8) steel cord with a wave-form core filament according to the present invention.

FIG. 7 shows schematically a cross sectional view of a (1+8) steel cord composed of one wavy core filament 1 and eight sheath filaments 2 twisted around the wavy core filament 1 according to the present invention.

The wavy core filament 1 extends in the space shown by the closed dotted line.

Figure 8:
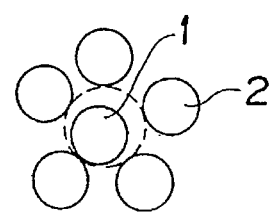
FIG. 8 is a schematical cross sectional view of a (1+5) steel cord with a helical core filament according to the present invention.

FIG. 8 shows schematically a cross sectional view of a (1+5) steel cord composed of one helical core filament 1 and five sheath filaments 2 twisted around the helical core filament 1 in which the helical direction of the helical core filament 1 is opposite to the direction of twisting the sheath filaments 2 according to the present invention.

The helical core filament 1 extends in the space shown by the closed dotted line.

Figure 9:
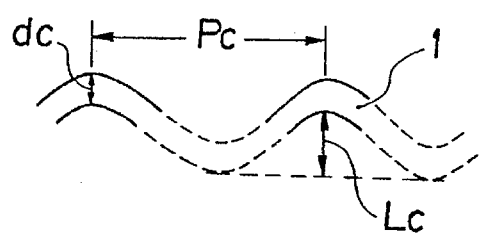
FIG. 9 is a schematical side view of a helical core filament viewed from the direction perpendicular to the axis of the filament.

FIG. 9 is a schematical side view of a helical core filament 1 viewed from the direction perpendicular to the axis of the helical core filament.

dc stands for the diameter of the helical core filament, Lc is the amplitude of the helical core filament and Pc the pitch of the helical core filament.

Figure 10:
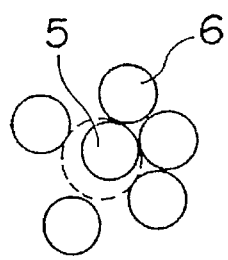
FIG. 10 is a schematical cross sectional view of a (1+5) steel cord with a helical core filament of which helical direction is the same as the direction of twisting sheath filaments showing that sheath filaments are contacted with each other.

FIG. 10 shows schematically a cross sectional view of a (1+5) steel cord composed of one helical core filament 5 and five sheath filaments 6 twisted around the helical core filament 5 in which the helical direction of the helical core filament 5 is the same as the direction of twisting the sheath filaments 6. The helical core filament 5 extends in the space shown by the closed dotted line.

The three sheath filaments 6 at the right hand side of the cord are in contact with each other.

Figure 11:
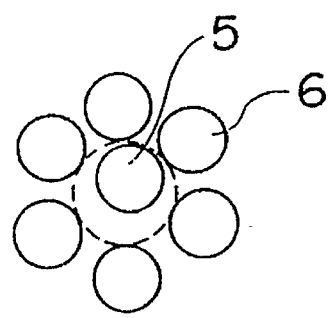
FIG. 11, FIG. 12 and FIG. 13 show schematically cross sectional views of (1+6) steel cord, (1+7) steel cord and (1+8) steel cord, each having a helical core filament, respectively, according to the present invention.

FIG. 11 shows schematically a cross sectional view of a (1+6) steel cord composed of one helical core filament 5 and six sheath filaments 6 twisted around the helical core filament 5 in which the helical direction of the helical core filament 5 is opposite to the direction of twisting the sheath filaments according to the present invention.

The helical core filament 5 extends in the space shown by the closed dotted line.

Figure 12:
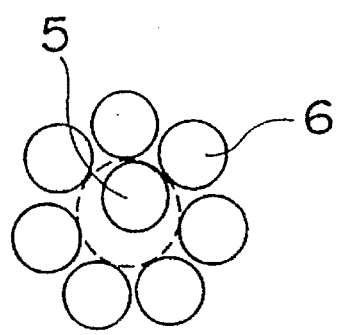

FIG. 12 shows schematically a cross sectional view of a (1+7) steel cord composed of one helical core filament 5 and seven sheath filaments 6 twisted around the helical core filament 5 in which the helical direction of the helical core filament 5 is opposite to the direction of twisting the sheath filaments 6 according to the present invention.

The helical core filament 5 extends in the space shown by the closed dotted line.

Figure 13:
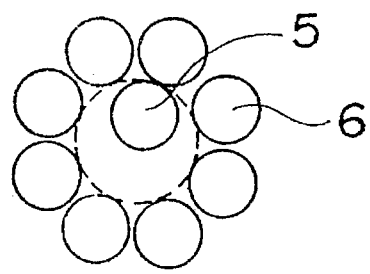

FIG. 13 shows schematically a cross sectional view of a (1+8) steel cord composed of one helical core filament 5 and eight sheath filaments 6 twisted around the helical core filament 5 in which the helical direction of the helical core filament 5 is opposite to the direction of twisting the sheath filaments 6 according to the present invention.

The helical core filament 5 extends in the space shown by the closed dotted line.

According to a further aspect of the present invention, there is proposed a pneumatic tire in which one of the above-mentioned steel cords is used as a reinforcing steel cord and the angle θ formed by a reinforcing steel cord and the equatorial plane of the tire, the gap between adjacent two steel cords in the same layer, I, and the gauge of the gum between two facing cords, G, are within the respective numerical ranges as mentioned above.

The angle θ is 12°≦θ≦30°. When θ is less than 12°, the shearing strain between layers during tire running increases and the separation is liable to occur.

The gap, I, is 0.5 mm≦I≦2.0 mm. When I is less than 0.5 mm, adjacent cracks formed at the end of belt are connected with one another and extend to the direction of the equatorial plane. As a result, separation is liable to occur.

The gauge of the gum, G, is 0.35 mm≦G≦2.0 mm. When G is less than 0.35 mm, the shearing strain between rubber layers of the cross belt layer during tire running increases and the separation is liable to occur.

On the contrary, when θ, I or G is larger than the upper limit, 30°, 2.0 mm or 2.0 mm, the stiffness of the cross belt layer in the direction of the equatorial plane is lowered, and the diameter of tire increases upon elevating the inner pressure and running. Therefore, strain occurs in the rubber around the steel cords, As a result, the separation is liable to occur.

A spiral filament may be added to the reinforcing steel cord. By adding a spiral filament, the shape at the cord cut end can be controlled, and therefore, the productivity is improved and development of crack formed at the belt end can be suppressed.

Even when the spiral filament is added, the diameter of the cord is not markedly affected, but the above-mentioned advantage can be obtained which is a far better advantage though adding the spiral filament is not essentional.

The reinforcing steel cord is preferably made of a steel containing 0.80–0.85% by weight of carbon. Further, the diameter of the core steel filament dc is preferably substantially the same as the diameter of the sheath steel filament ds. The advantages resulting from the above-mentioned carbon content and the filament diameters dc and ds are similar to those with respect of the steel cord itself as mentioned above.

Figure 14:
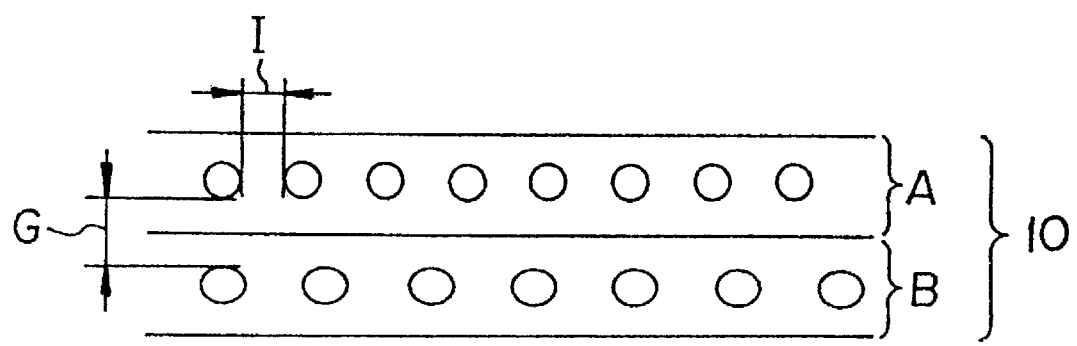
"FIG. 14" shows a schematical cross sectional view perpendicular to one cross layer belt gauge at a crown center of a tire of the present invention.

Referring to FIG. 14, a schematical cross sectional view is illustrated perpendicular to cords of layer A of a cross belt layer 10 composed of layer A and layer B, at the crown center portion of a tire of the present invention.

The letter i denotes a gap between adjacent two steel cords in the same layer, and G a gauge of the gum between two facing cords.

The pneumatic tire according to the present invention exhibits a good suppression to the propagation of corrosion due to water and the like while the strength of cord can be retained, and the tire structure is suitable for suppressing development of cracks at the belt end. Therefore, the durability of the tire is improved and the life of tire can be improved to a great extent.

The present invention is now more particularly described with reference to the following examples which are for the purpose of illustration only and are intended to imply no limitation thereon.

EXAMPLES 1–16, COMPARATIVE EXAMPLES 1–14

There were prepared thirty radial tires for truck and bus of size of 10.00 R20 having a belt in which steel cords were buried, the steel cords having core forming ratio Rc, core wavy pitch Pc, cord structure, core filament diameter dc, sheath filament diameter ds, and sheath twisting pitch Ps as shown in Tables 1–6.

The resulting thirty radial tires were evaluated for resistance to corrosion propagation (separation resistance) and cord strength. The results are shown in Tables 1–6.

The resistance to corrosion propagation was measured as follows.

A belt cord (100 mm) covered with rubber was taken out from a tire and the side surface was covered with a silicone sealant. Then, one end of the cord was soaked in a 10% aqueous solution of NaOH and the aqueous solution was allowed to enter the cord from the cut surface only. After 24 hours of the soaking, the rubber was peeled off by means of pinchers, and the length (mm) of the cord where the metal was exposed was regarded as a corrosion propagation portion.

TABLE 1

|  | Example | | | | | |
| --- | --- | --- | --- | --- | --- | --- |
|  | 1 | 2 | 3 | 4 | 5 | 6 |
| Core forming ratio Rc | 0.15 | 0.47 | 0.47 | 0.62 | 1.0 | 0.47 |
| Core wave-form pitch Pc (mm) | 3.3 | 3.3 | 4.4 | 5.5 | 9.0 | 3.0 |
| Cord structure | 1 + 5 | 1 + 5 | 1 + 5 | 1 + 5 | 1 + 5 | 1 + 5 |
| Core filament diameter dc (mm) | 0.34 | 0.34 | 0.34 | 0.34 | 0.34 | 0.23 |
| Sheath filament diameter ds (mm) | 0.34 | 0.34 | 0.34 | 0.34 | 0.34 | 0.23 |
| Sheath twisting pitch Ps (mm) | 17 | 17 | 17 | 17 | 17 | 11.5 |
| Resistance to corrosion propagation (mm) | 20 | 10 | 10 | 10 | 15 | 10 |
| Cord strength (kgf) | 171 | 170 | 171 | 170 | 169 | 77 |

TABLE 2

|  | Comparative Example | | | | |
| --- | --- | --- | --- | --- | --- |
|  | 1 | 2 | 3 | 4 | 5 |
| Core forming ratio Rc | 0.10 | 0.47 | 1.2 | 0.47 | 1.2 |
| Core wave-form pitch Pc (mm) | 4.4 | 2.8 | 5.5 | 11.0 | 3.0 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.23 |
| Sheath filament diameter ds (mm) | 0.34 | 0.34 | 0.34 | 0.34 | 0.23 |
| Sheath twisting pitch | 17 | 17 | 17 | 17 | 11.5 |

TABLE 2-continued

|  | Comparative Example | | | | |
|---|---|---|---|---|---|
|  | 1 | 2 | 3 | 4 | 5 |
| Ps (mm) |  |  |  |  |  |
| Resistance to corrosion propagation (mm) | 85 | 10 | 10 | 100 | 10 |
| Cord strength (kgf) | 171 | 155 | 153 | 170 | 69 |

TABLE 3

|  | Example | | | | |
|---|---|---|---|---|---|
|  | 7 | 8 | 9 | 10 | 11 |
| Core forming ratio Rc | 0.15 | 0.47 | 0.32 | 0.47 | 0.47 |
| Core wave-form pitch Pc (mm) | 3.3 | 3.3 | 4.4 | 4.4 | 5.5 |
| Cord structure | 1 + 6 | 1 + 6 | 1 + 6 | 1 + 6 | 1 + 6 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.34 |
| Sheath twisting pitch Ps (mm) | 17 | 17 | 17 | 17 | 17 |
| Resistance to corrosion propagation (mm) | 30 | 10 | 15 | 10 | 17 |
| Cord strength (kgf) | 201 | 199 | 200 | 200 | 200 |

TABLE 4

|  | Example | | | | |
|---|---|---|---|---|---|
|  | 12 | 13 | 14 | 15 | 16 |
| Core forming ratio Rc | 0.62 | 1.5 | 0.47 | 1.2 | 1.0 |
| Core wave-form pitch Pc (mm) | 5.5 | 9.0 | 3.0 | 6.5 | 6.0 |
| Cord structure | 1 + 6 | 1 + 6 | 1 + 6 | 1 + 8 | 1 + 7 |
| Core filament diameter dc (mm) | 0.34 | 0.34 | 0.23 | 0.34 | 0.34 |
| Sheath filament diameter ds (mm) | 0.34 | 0.34 | 0.23 | 0.34 | 0.34 |
| Stheath twisting pitch Ps (mm) | 17 | 17 | 11.5 | 17 | 17 |
| Resistance to corrosion propagation (mm) | 10 | 20 | 10 | 20 | 20 |
| Cord strength (kgf) | 199 | 197 | 90 | 253 | 225 |

TABLE 5

|  | Comparative Example | | | | |
|---|---|---|---|---|---|
|  | 6 | 7 | 8 | 9 | 10 |
| Core forming ratio Rc | 0.10 | 0.47 | 1.6 | 0.47 | 0 |
| Core wave-form pitch Pc (mm) | 4.4 | 2.8 | 6.0 | 11.0 | — |
| Cord structure | 1 + 6 | 1 + 6 | 1 + 6 | 1 + 6 | 1 + 6 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.28 |
| Sheath twisting pitch Ps (mm) | 17 | 17 | 17 | 17 | 14 |
| Resistance to corrosion propagation (mm) | 100 | 10 | 10 | 100 | 60 |
| Cord strength (kgf) | 200 | 182 | 180 | 200 | 150 |

TABLE 6

|  | Comparative Example | | | |
|---|---|---|---|---|
|  | 11 | 12 | 13 | 14 |
| Core forming ratio Rc | 0 | 1.6 | 0.4 | 0.90 |
| Core wave-form pitch Pc (mm) | — | 3.0 | 6.0 | 6.5 |
| Cord structure | 1 + 6 | 1 + 6 | 1 + 7 | 1 + 8 |
| Core filament diameter dc (mm) | 0.40 | 0.23 | 0.34 | 0.34 |
| Sheath filament diameter ds (mm) | 0.34 | 0.23 | 0.34 | 0.34 |
| Sheath twisting pitch Ps (mm) | 17 | 11.5 | 17 | 17 |
| Resistance to corrosion propagation (mm) | 55 | 10 | 80 | 80 |
| Cord strength (kgf) | 202 | 80 | 225 | 253 |

Comparative Example 1 shows that the resistance to corrosion propagation was as poor as 85 mm when the core forming ratio was less than 0.12.

Comparative Example 2 shows that the cord strength was lowered to 155 kgf when the core wavy pitch was less than 3.00 mm.

Comparative Example 3 shows that the cord strength was lowered to 153 kgf when the core forming ratio is larger than 1.0.

Comparative Example 4 shows that the resistance to corrosion propagation was as poor as 100 mm when the core wavy pitch was larger than 10.0 mm.

Comparative Example 5 shows that the cord strength was lowered to 69 kgf as compared with Example 6 when the core forming ratio was larger than 1.0 though the core filament diameter and the sheath filament diameter were small.

Comparative Example 6 shows that the resistance to corrosion propagation was as poor as 100 mm when the core forming ratio was smaller than 6.12.

Comparative Example 7 shows that the cord strength was as poor as 182 kgf when the core wavy pitch Pc smaller then 3.0 dc/0.34.

Comparative Example 8 shows that the cord strength was as poor as 180 kgf when the core forming ratio was larger than 1.5.

Comparative Example 9 shows that the resistance to corrosion propagation was as poor as 100 mm when the core wavy pitch Pc was larger than 10.0 dc/0.34.

Comparative Examples 10 and 11 show that the resistance to corrosion propagation was poor in each case where the core filament was not formed into crimp.

Comparative Examples 12 shows that the cord strength was as poor as 80 kgf when the core forming ratio was larger than 1.5 and each of the core filament and the sheath filament was 0.23 mm in diameter.

Comparative Example 13 shows that the resistance to corrosion propagation was poor when a (1+7) structure was used and the core forming ratio was smaller than 0.48.

Comparative Example 14 shows that the resistance to corrosion propagation was poor when a (1+8) structure was used and the core forming ratio was smaller than 0.98.

EXAMPLES 17–32, COMPARATIVE EXAMPLES 15–30

There were prepared thirty two radial tires for truck and bus of a size of 10.00 R20 having a belt in which steel cords were buried, the steel cords having core forming ratio Rc, core helical pitch Pc, cord structure, core filament diameter dc, sheath filament diameter ds, sheath twisting pitch Ps, core shaping helical direction and sheath twisting direction as shown in Tables 7–12.

The resulting 32 radial tires were evaluated for resistance to corrosion propagation (separation resistance) and cord strength. The results are shown in Tables 7–12.

The resistance to corrosion propagation was measured as mentioned above.

The helical direction and sheath twisting direction (Z and S) are difined by JIS G 3510.

Separation resistance is measured by disintegrating a pneumatic tire fitted to a car and worn completely as a result of having run over a bad road and observing whether a separation at the end of belt occurred.

TABLE 7

|  | Example | | | | |
|---|---|---|---|---|---|
|  | 17 | 18 | 19 | 20 | 21 |
| Core forming ratio Rc | 0.15 | 0.47 | 0.47 | 0.62 | 1.0 |
| Core helical pitch (mm) | 3.3 | 3.3 | 4.4 | 5.5 | 9.0 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.34 |
| Sheath twisting pitch Ps (mm) | 17 | 17 | 17 | 17 | 17 |
| Core forming helical direction | Z | Z | Z | Z | Z |
| Sheath twisting direction | S | S | S | S | S |
| Resistance to corrosion propagation (mm) | 20 | 10 | 10 | 10 | 15 |
| Cord strength (kgf) | 171 | 170 | 171 | 170 | 169 |

TABLE 8

|  | Example | | | | |
|---|---|---|---|---|---|
|  | 22 | 23 | 24 | 25 | 26 |
| Core forming ratio Rc | 0.47 | 0.15 | 0.47 | 0.32 | 0.47 |
| Core helical pitch (mm) | 3.0 | 3.3 | 3.3 | 4.4 | 4.4 |
| Cord structure | 1 + 5 | 1 + 6 | 1 + 6 | 1 + 6 | 1 + 6 |
| Core filament diameter dc (mm) | 0.23 | 0.34 | 0.34 | 0.34 | 0.34 |
| Sheath filament diameter ds (mm) | 0.23 | 0.34 | 0.34 | 0.34 | 0.34 |
| Sheath twisting pitch Ps (mm) | 11.5 | 17 | 17 | 17 | 17 |
| Core forming helical direction | Z | Z | Z | Z | Z |
| Sheath twisting direction | S | S | S | S | S |
| Resistance to corrosion propagation (mm) | 10 | 30 | 10 | 15 | 10 |
| Cord strength (kgf) | 77 | 201 | 199 | 200 | 200 |

TABLE 9

|  | Example | | | | | |
|---|---|---|---|---|---|---|
|  | 27 | 28 | 29 | 30 | 31 | 32 |
| Core forming ratio Rc | 0.47 | 0.62 | 1.5 | 0.47 | 1.2 | 1.0 |
| Core helical pitch (mm) | 5.5 | 5.5 | 9.0 | 3.0 | 6.5 | 6.0 |
| Cord structure | 1 + 6 | 1 + 6 | 1 + 6 | 1 + 6 | 1 + 8 | 1 + 7 |
| Core filament diameter dc (mm) | 0.34 | 0.34 | 0.34 | 0.23 | 0.34 | 0.34 |
| Sheath filament diameter ds (mm) | 0.34 | 0.34 | 0.34 | 0.23 | 0.34 | 0.34 |
| Sheath twisting pitch Ps (mm) | 17 | 17 | 17 | 11.5 | 17 | 17 |
| Core forming helical direction | Z | Z | Z | Z | Z | Z |
| Sheath twisting direction | S | S | S | S | S | S |
| Resistance to corrosion propagation (mm) | 17 | 10 | 20 | 10 | 20 | 20 |
| Cord strength (kgf) | 200 | 199 | 197 | 90 | 253 | 225 |

TABLE 10

|  | Comparative Example | | | | |
|---|---|---|---|---|---|
|  | 15 | 16 | 17 | 18 | 19 |
| Core forming ratio Rc | 0.10 | 0.47 | 1.2 | 0.47 | 0.47 |
| Core helical pitch (mm) | 4.4 | 2.8 | 5.5 | 11.0 | 4.4 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.34 |
| Sheath twisting pitch Ps (mm) | 17 | 17 | 17 | 17 | 17 |
| Core forming helical direction | Z | Z | Z | Z | S |
| Sheath twisting direction | S | S | S | S | S |
| Resistance to corrosion propagation (mm) | 85 | 10 | 10 | 100 | 55 |
| Cord strength (kgf) | 171 | 155 | 153 | 170 | 171 |

TABLE 11

| | Comparative Example | | | | |
|---|---|---|---|---|---|
| | 20 | 21 | 22 | 23 | 24 |
| Core forming ratio Rc | 1.2 | 0.10 | 0.47 | 1.6 | 0.47 |
| Core helical pitch (mm) | 3.0 | 4.4 | 2.8 | 6.0 | 11.0 |
| Cord structure | 1 + 5 | 1 + 6 | 1 + 6 | 1 + 6 | 1 + 6 |
| Core filament diameter dc (mm) | 0.23 | 0.34 | 0.34 | 0.34 | 0.34 |
| Sheath filament diameter ds (mm) | 0.23 | 0.34 | 0.34 | 0.34 | 0.34 |
| Sheath twisting pitch Ps (mm) | 11.5 | 17 | 17 | 17 | 17 |
| Core forming helical direction | Z | Z | Z | Z | Z |
| Sheath twisting direction | S | S | S | S | S |
| Resistance to corrosion propagation (mm) | 10 | 100 | 10 | 10 | 100 |
| Cord strength (kgf) | 69 | 200 | 182 | 180 | 200 |

TABLE 12

| | Comparative Example | | | | | |
|---|---|---|---|---|---|---|
| | 25 | 26 | 27 | 28 | 29 | 30 |
| Core forming ratio Rc | 0 | 0 | 0.47 | 1.6 | 0.35 | 0.65 |
| Core helical pitch (mm) | — | — | 4.4 | 3.0 | 6.0 | 6.5 |
| Cord structure | 1 + 6 | 1 + 6 | 1 + 6 | 1 + 6 | 1 + 7 | 1 + 8 |
| Core filament diameter dc (mm) | 0.34 | 0.40 | 0.34 | 0.23 | 0.34 | 0.34 |
| Sheath filament diameter ds (mm) | 0.28 | 0.34 | 0.34 | 0.23 | 0.34 | 0.34 |
| Sheath twisting pitch Ps (mm) | 14 | 17 | 17 | 11.5 | 17 | 17 |
| Core forming helical direction | Z | Z | S | Z | Z | Z |
| Sheath twisting direction | S | S | S | S | S | S |
| Resistance to corrosion propagation (mm) | 60 | 55 | 55 | 10 | 90 | 90 |
| Cord strength (kgf) | 150 | 202 | 202 | 80 | 225 | 253 |

In Tables 10 and 11, Comparative Examples 15–20 are concerned with (1+5) structure.

Comparative Example 15 shows that the resistance to corrosion propagation was as poor as 85 mm when the core forming ratio Rc was less than 0.12.

Comparative Example 16 shows that the cord strength was deteriorated when the core helical pitch Pc was less than 3.0 dc/0.34.

Comparative Example 17 shows that the cord strength was deteriorated when the core forming ratio Rc was 1.0.

Comparative Example 18 shows that the resistance to corrosion propagation was as poor as 100 mm when the core helical pitch Pc was larger than 10.0 dc/0.34.

Comparative Example 19 shows that the resistance to corrosion propagation was as poor as 55 mm when the helical direction was the same as the sheath twisting direction.

In Table 11, Comparative Example 20 shows that the cord strength was deteriorated when the core forming ratio Rc was larger than 1.0.

Comparative Examples 21–28 are concerned with (1+6) structure.

Comparative Example 21 shows that the resistance to corrosion propagation was as poor as 100 mm when the core forming ratio Rc was less than 0.12.

Comparative Example 22 shows that the cord strength was deteriorated when the core helical pitch Pc was smaller than 3.0 dc/0.34.

Comparative Example 23 shows that the cord strength was deteriorated when the core shaping ratio Rc was larger than 1.5.

Comparative Example 24 shows that the resistance to corrosion propagation was as poor as 100 mm when the core helical pitch Pc was larger than 10.0 dc/0.34.

In Table 12, Comparative Examples 25 and 26 are concerned with cases where no core forming was effected, and show that the resistance to corrosion resistance was deteriorated in both cases and when the sheath filament diameter was thinner, the cord strength was also lowered.

Comparative Example 27 shows that the resistance to corrosion propagation was poor when the core forming helical direction was the same as the sheath twisting direction.

Comparative Example 28 shows that the cord strength was deteriorated when the core forming ratio was larger 1.5 (the filament diameter was as small as 0.23 mm in both core and sheath).

Comparative Example 29 shows that the resistance to corrosion propagation was poor when the structure was (1+7) and the core forming ratio Rc was smaller than 0.42.

Comparative Example 30 shows that the resistance to corrosion propagation was poor when the structure was (1+8) and the core forming ratio Rc was smaller than 0.74.

COMPARATIVE EXAMPLES 31–42

Following the procedures of Examples 1–16 under the conditions as shown in Tables 13–14, tires were prepared and the properties were tested. The results are shown in Tables 13 and 14.

In Comparative Examples 31, 32, 37 and 38, θ was outside of the numerical range of the present invention.

In Comparative Examples 33, 34, 39 and 40, I was outside of the numerical range of the present invention.

In Comparative Examples 35, 36, 41, and 42, G was outside of the numerical range of the present invention.

In the above cases, separation occurred as a result of the tire running. When the tires of Examples 1–5 were made under the conditions of θ=16°, I=0.8 mm, G=0.6 mm and those of Examples 7–16 under θ=16°, I=0.85 mm and G=0.6 mm, no separation occurred.

COMPARATIVE EXAMPLES 43–48

Following the procedures of Examples 17–32 under the conditions in Table 15, tires were prepared and tested. The results are shown in Table 15.

θ in Comparative Examples 43 and 44, I in Comparative Examples 45 and 46, and G in Comparative Examples 47 and 48 were outside of the respective numerical conditions of the present invention, and separation occurred as a result of the tire running.

When the tires of Examples 17–32 were made under θ=16°, I=0.85 mm and G=0.6 mm, no separation occurred.

TABLE 13

|  | Comparative Example | | | | | |
|---|---|---|---|---|---|---|
|  | 31 | 32 | 33 | 34 | 35 | 36 |
| Core forming ratio Rc | 0.62 | 0.62 | 0.62 | 0.62 | 0.62 | 0.62 |
| Core wave-form pitch Pc (mm) | 5.5 | 5.5 | 5.5 | 5.5 | 5.5 | 5.5 |
| Cord structure | 1 + 5 | 1 + 5 | 1 + 5 | 1 + 5 | 1 + 5 | 1 + 5 |
| Core filament diameter dc (mm) | 0.34 | 0.34 | 0.34 | 0.34 | 0.34 | 0.34 |
| Sheath filament diameter ds (mm) | 0.34 | 0.34 | 0.34 | 0.34 | 0.34 | 0.34 |
| Sheath twisting pitch Ps (mm) | 17 | 17 | 17 | 17 | 17 | 17 |
| θ (degree) | 11 | 31 | 16 | 16 | 16 | 16 |
| I (mm) | 0.8 | 0.8 | 0.4 | 2.2 | 0.8 | 0.8 |
| G (mm) | 0.6 | 0.6 | 0.6 | 0.6 | 0.03 | 2.5 |
| Resistance to corrosion propagation (mm) | 10 | 10 | 10 | 10 | 10 | 10 |
| Cord strength (kgf) | 170 | 170 | 170 | 170 | 170 | 170 |
| Occurrence of separation | Yes | Yes | Yes | Yes | Yes | Yes |

TABLE 14

|  | Comparative Examples | | | | | |
|---|---|---|---|---|---|---|
|  | 37 | 38 | 39 | 40 | 41 | 42 |
| Core forming ratio Rc | 0.62 | 0.62 | 0.62 | 0.62 | 0.62 | 0.62 |
| Core wave-form pitch Pc (mm) | 5.5 | 5.5 | 5.5 | 5.5 | 5.5 | 5.5 |
| Cord structure | 1 + 6 | 1 + 6 | 1 + 6 | 1 + 6 | 1 + 6 | 1 + 6 |
| Core filament diameter dc (mm) | 0.34 | 0.34 | 0.34 | 0.34 | 0.34 | 0.34 |
| Sheath filament diameter ds (mm) | 0.34 | 0.34 | 0.34 | 0.34 | 0.34 | 0.34 |
| Sheath twisting pitch Ps (mm) | 17 | 17 | 17 | 17 | 17 | 17 |
| Resistance to corrosion propagation (mm) | 10 | 10 | 10 | 10 | 10 | 10 |
| Cord strength (kgf) | 199 | 199 | 199 | 199 | 199 | 199 |
| θ (degree) | 11 | 31 | 16 | 16 | 16 | 16 |
| I (mm) | 0.85 | 0.85 | 0.4 | 2.2 | 0.85 | 0.85 |
| G (mm) | 0.6 | 0.6 | 0.6 | 0.6 | 0.30 | 2.5 |
| Occurrence of separation | Yes | Yes | Yes | Yes | Yes | Yes |

TABLE 15

|  | Comparative Example | | | | | |
|---|---|---|---|---|---|---|
|  | 43 | 44 | 45 | 46 | 47 | 48 |
| Core forming ratio Rc | 0.62 | 0.62 | 0.62 | 0.62 | 0.62 | 0.62 |
| Core helical pitch Pc (mm) | 5.5 | 5.5 | 5.5 | 5.5 | 5.5 | 5.5 |
| Cord structure | 1 + 6 | 1 + 6 | 1 + 6 | 1 + 6 | 1 + 6 | 1 + 6 |
| Core filament diameter dc (mm) | 0.34 | 0.34 | 0.34 | 0.34 | 0.34 | 0.34 |
| Sheath filament diameter ds (mm) | 0.34 | 0.34 | 0.34 | 0.34 | 0.34 | 0.34 |
| Sheath twisting pitch Ps (mm) | 17 | 17 | 17 | 17 | 17 | 17 |
| Core forming helical direction | Z | Z | Z | Z | Z | Z |

TABLE 15-continued

|  | Comparative Example | | | | | |
|---|---|---|---|---|---|---|
|  | 43 | 44 | 45 | 46 | 47 | 48 |
| Sheath twisting direction | S | S | S | S | S | S |
| Resistance to corrosion propagation (mm) | 10 | 10 | 10 | 10 | 10 | 10 |
| Cord strength (kgf) | 199 | 199 | 199 | 199 | 199 | 199 |
| θ (degree) | 11 | 31 | 16 | 16 | 16 | 16 |
| I (mm) | 0.85 | 0.85 | 0.4 | 2.2 | 0.85 | 0.85 |
| G (mm) | 0.6 | 0.6 | 0.6 | 0.6 | 0.30 | 2.1 |
| Occurrence of separation | Yes | Yes | Yes | Yes | Yes | Yes |

What is claimed is:

1. A steel cord for reinforcing rubber articles which comprises a single wavy core steel filament having a sinusoidal shape, and a plurality of twisting sheath steel filaments disposed around the wavy core steel filament, the pitch Pc of the wavy core steel filament being in the following range, $$3.0 \, dc/0.34 \leq Pc \leq 10.0 \, dc/0.34$$

where dc is the diameter of the core steel filament, and the core forming ratio Rc(=Lc/dc) where dc is as defined above and Lc is an amplitude of the wave of the core steel filament being selected from the group consisting of $$0.12 \leq Rc \leq 1.0$$

in the case of five sheath steel filaments, $$0.12 \leq Rc \leq 1.5$$

in the case of six sheath steel filaments, $$0.48 \leq Rc \leq 1.86$$

in the case of seven sheath steel filaments, and $$0.98 \leq Rc \leq 2.36$$

in the case of eight sheath steel filaments.

2. The steel cord according to claim 1 in which the carbon content of the steel is 0.80–0.85% by weight.

3. The steel cord according to claim 1 or 2 in which the diameter of the single core steel filament dc is substantially the same as the diameter of the sheath steel filament ds.

* * * * *